(12) United States Patent
Westrate (10) Patent No.: US 7,353,635 B2
(45) Date of Patent: Apr. 8, 2008

(54) TREE ROOT BALL WRAPPING APPARATUS AND METHOD OF USING SAME

(76) Inventor: William P. Westrate, 21406 McKenzie St., Cassopolis, MI (US) 49031

( * ) Notice: Subject to any disclaimer, the term of this patent is extended or adjusted under 35 U.S.C. 154(b) by 0 days.

(21) Appl. No.: 11/092,255

(22) Filed: Mar. 29, 2005

(65) Prior Publication Data

US 2006/0225345 A1   Oct. 12, 2006

(51) Int. Cl.
*A01G 23/04*   (2006.01)

(52) U.S. Cl. ............... 47/76; 47/73; 47/66.1; 47/66.4; 47/66.3; 47/65; 47/32.7; 47/32; 206/423

(58) Field of Classification Search ............ 47/73, 47/66.7, 75, 66.1, 66.4, 78, 66.3, 76, 65, 47/65.5, 32, 32.2, 32.3, 904, 32.7, 32.8; 206/423; 220/19, 4.29, 4.23, 4.22, 13.9, 647, 668, 220/651–654; D6/416; 211/62; 111/100, 111/114, 101; D8/1; 217/12 A, 49, 51, 57, 217/122, 123; D11/143, 144, 152, 149, 153; *A01G 23/04*
See application file for complete search history.

(56) References Cited

U.S. PATENT DOCUMENTS

| | | | | |
|---|---|---|---|---|
| 310,261 | A | * | 1/1885 | Downing ............... 119/58 |
| 375,824 | A | * | 1/1888 | Light ............... 119/60 |
| 387,892 | A | * | 8/1888 | Light ............... 119/60 |
| 610,156 | A | * | 8/1898 | Mechwart ............... 47/73 |
| 879,613 | A | | 2/1908 | Edwards |
| 1,688,846 | A | * | 10/1928 | Andrews ............... 210/464 |
| 1,776,375 | A | * | 9/1930 | Russell ............... 47/73 |
| D102,332 | S | * | 12/1936 | Manety ............... D11/152 |
| 2,792,948 | A | * | 5/1957 | De Shano ............... 414/23 |
| D185,682 | S | * | 7/1959 | Sheffler ............... D30/128 |
| 3,032,368 | A | | 1/1962 | Sigler et al. |
| 3,134,196 | A | * | 5/1964 | Hansen ............... 47/74 |
| 3,161,989 | A | | 12/1964 | Sigler et al. |
| D226,279 | S | * | 2/1973 | Eyerly ............... D11/148 |
| 3,782,773 | A | * | 1/1974 | Mason ............... 296/3 |
| 3,979,856 | A | | 9/1976 | Belcher |
| 4,059,921 | A | * | 11/1977 | Moriwaki ............... 47/73 |
| 4,062,148 | A | | 12/1977 | Edmonds, Jr. et al. |
| 4,089,301 | A | * | 5/1978 | Harden ............... 119/60 |
| 4,109,442 | A | | 8/1978 | Maasbach |
| 4,216,622 | A | * | 8/1980 | Hollenbach et al. ............ 47/71 |
| D257,095 | S | * | 9/1980 | Lin ............... D11/152 |
| 4,249,344 | A | | 2/1981 | Pratt |
| 4,250,664 | A | | 2/1981 | Remke |

(Continued)

FOREIGN PATENT DOCUMENTS

GB   2045044 A   * 10/1980

*Primary Examiner*—Andrea M. Valenti
(74) *Attorney, Agent, or Firm*—Price Heneveld Cooper Dewitt & Litton LLP (57) ABSTRACT

A tree root ball wrapping apparatus (100) includes a circular platform (109, 113) for supporting a separable, open-frame, root-containment structure (103, 105, 107) having an inverted conical shape. A group of pivot joints (201, 203, 205, 207) are located at an upper section of the root-containment structure for separating the root-containment structure into half sections. In practice, the group of pivot joints can be opened during tree transplantation for providing removal of a root ball from the wrapping apparatus by opening the sections at the group of pivot joints for easily facilitating removal of the wrapping apparatus (100) from within a transplantation hole.

10 Claims, 7 Drawing Sheets

U.S. PATENT DOCUMENTS

| | | |
|---|---|---|
| 4,287,840 A | 9/1981 | Weidner |
| 4,478,260 A | 10/1984 | Eichler |
| 4,570,423 A | 2/1986 | DeLong |
| D311,666 S | 10/1990 | Burke |
| 5,025,590 A | 6/1991 | Smith |
| D322,522 S * | 12/1991 | Ferris .......................... D6/405 |
| 5,090,157 A | 2/1992 | Sipala |
| 5,359,809 A * | 11/1994 | Johnson ......................... 47/73 |
| 5,445,396 A * | 8/1995 | Sebor ..................... 280/33.998 |
| 5,496,143 A * | 3/1996 | Breyer ......................... 414/23 |
| 5,983,565 A * | 11/1999 | Chu ............................... 47/73 |
| 6,202,348 B1 * | 3/2001 | Reiger ........................... 47/78 |
| 6,951,189 B1 * | 10/2005 | Lienemann ................... 119/60 |
| 2003/0208957 A1* | 11/2003 | Meurer ......................... 47/73 |
| 2006/0005466 A1* | 1/2006 | Atchley ......................... 47/39 |

* cited by examiner

TREE ROOT BALL WRAPPING APPARATUS AND METHOD OF USING SAME

TECHNICAL FIELD

This invention relates in general to horticultural devices and, more particularly, to an apparatus and method for containing and transporting a tree root ball after ground excavation.

BACKGROUND

In order to protect a tree root ball during excavation, transplantation or transport, the ball of dirt or soil that surrounds the roots of the tree or shrub must be wrapped in some way to maintain the shape and structural integrity of the root ball. This enables the roots to remain protected so that when transplanted in a pot or in the ground, the root structure remains essentially intact. This allows water and nutrients to utilize the remaining root structure to maintain the tree's health and structural integrity. The root ball is often tightly wrapped in a burlap and wire mesh material to keep the dirt compacted around the root structure. This enables the soil to remain with the root ball thereby facilitating transportation and providing a higher probability of successful transplantation.

A problem often arises when trying to tie the cloth or wire material around the root ball. In situations where light, loose soil, such as sand, surrounds the root ball, the soil will not remain compacted around the ball. In many cases, the root ball is very large and heavy which makes it difficult to move the ball so as to completely wrap the material around its perimeter. Moreover, this task often takes two or more persons an inordinate amount of time to move the ball into position where it is properly tied. Once the root ball is tied, it must then be lifted so that it can be transported to a point of sale or location where it might be transplanted.

U.S. Pat. No. 4,570,423 to DeLong, which is herein incorporated by reference, teaches a tree ball wrapping device that is comprised of a three-section, inverted, conically-shaped holder that uses sheet metal to form the cone. When in use, a burlap material is first placed in the holder. A tree root ball is then later placed in the burlap for tying the root ball using rope or cord. Once wrapped, the tree must be removed by opening one or more hinged sheet metal sections where the tree can then be transported. The principal disadvantage of this type of device is that it does not allow the underside of the root ball to be tied. Moreover, if the burlap is improperly positioned when the root ball is placed in the device, it cannot be corrected without raising the heavy root ball and repositioning the material. Additionally, the tree must be removed from the device to be transported and cannot move with the tree to its final destination. In other words, this device is not used in transporting, storing or replanting the tree since the tree is separated from the device after it is wrapped.

Therefore, the need exists for an apparatus and method for containing a tree root ball that operates easily not only to wrap the root ball but also to stay with the tree to be used to transport, store, display and transplant the tree. Additionally, the invention should automatically correct the position of differing types of wrapping materials to be used to store, display and transplant the tree.

SUMMARY OF THE INVENTION

A tree root ball wrapping apparatus composed of a hinged open-frame structure that includes inner and outer frames. The inner frame forms an inverted truncated conical shape within an outer frame. In use, a tree root ball can easily be set into a receptacle such as a preformed basket with burlap or planting pot which is inserted within the wrapping apparatus. The root ball can then be tied, bound or otherwise prepared using wire, burlap or other material for movement or transplantation. The wrapping apparatus is then transported along with the root ball where it can then be positioned adjacent to, above, or lowered into a transplantation hole. The wrapping apparatus includes a plurality of pivot points which open either from the top or side to allow the device to be separated into two or more sections. This permits the wrapping apparatus to be easily separated from the root ball. The invention allows a single worker to easily wrap, stabilize, move, transport and transplant a substantially large tree or shrub without the need to use a work crew.

DETAILED DESCRIPTION OF THE PREFERRED EMBODIMENT

Figure 1:
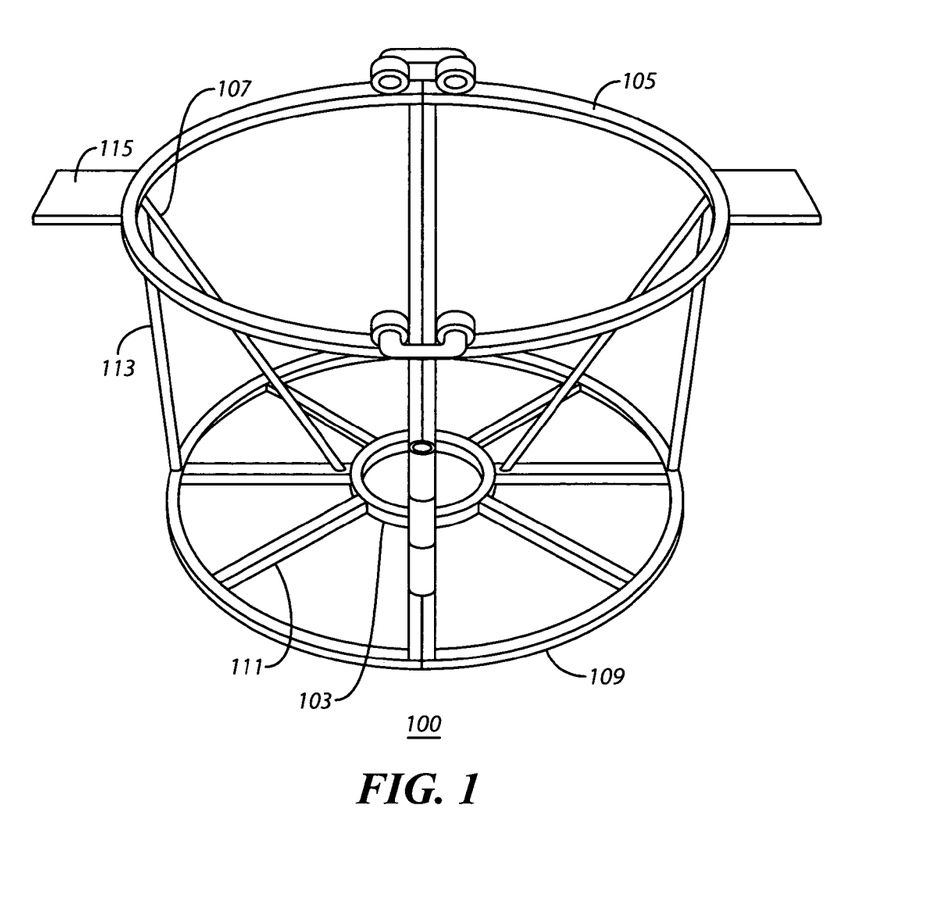
FIG. 1 is an elevated perspective view of the tree root ball wrapping apparatus in accordance with the preferred embodiment of the invention.

Referring now to FIG. 1, the tree root ball wrapping apparatus 100 includes a lower inner frame 103 having a first circular diameter and an upper outer frame 105 having a second circular diameter. The lower inner frame 103 and upper outer frame 105 are joined using a plurality of angular support members 107 which act to rigidly hold the lower inner frame 103 and upper outer frame 105 in a fixed position. Optionally, a plurality of bridge members (not shown) may be used between the angular support member 107 to provide a more rigid structure and to guide the root ball into the lower inner frame 103.

As best seen in FIG. 1, the first circular diameter of the lower inner frame 103 is substantially smaller than the second circular radius of the upper outer frame 105 so as to form an inverted truncated conical shape. The inverted truncated conical shape is specially used to accommodate the shape of a tree root ball that has been extracted from the ground using a mechanical tree digging spade. The invention works to accommodate all types and sizes of preformed wire baskets, or other containers, used for all makes of mechanical tree spades. As will be evident to those skilled in the art, the tree root ball apparatus 100 shown herein is manufactured from approximately one-half inch steel rod stock. However, any rigid material such as a metallic tubing or a high-impact plastic that can act to support the weight of a tree while inserted into the device might also be used.

The tree root ball wrapping apparatus 100 further includes a base section 109 that acts as a support stand. The base section 109 includes a circular member that surrounds the lower frame 103 and is attached to the lower support frame 103 using a plurality of horizontal support members 111. The base section 109 is also attached to the upper frame 105 using a plurality of vertical support members 113. Since the circular diameter of the base section 109 is substantially equal to or greater than the circular diameter of the upper frame 105, this enables the base section 109 to provide a highly stable support platform to both the lower frame 103 and upper frame 105. Thus, while a tree root ball is seated within the root ball wrapping apparatus 100, the device has a stable foundation and will not tip or pitch to one side based upon the resting angle of the tree. This enables one or more workers to easily and expeditiously wrap the root ball while the root ball is seated within the device. Moreover, the device provides stability during transport and storage or against wind loads exerted against the tree.

Additionally, the tree root ball wrapping apparatus 100 further includes a plurality of carrying stubs 115 that provide a lifting surface for enabling the worker to lift and/or move the tree root ball wrapping apparatus. The apparatus can be transported into another location or positioned using a front end loader or other lifting machinery. Those skilled in the art will recognize the lifting stubs 115 provide a means with which to easily move a tree onto a trailer or bed of a truck for transport to a desired location. Unlike other devices used in the prior art, the present invention does not exert force on the root ball when it is lifted for transportation. Instead, the only exerted force is on the lifting stubs 115, thus avoiding root ball distortion and root damage.

Figure 2:
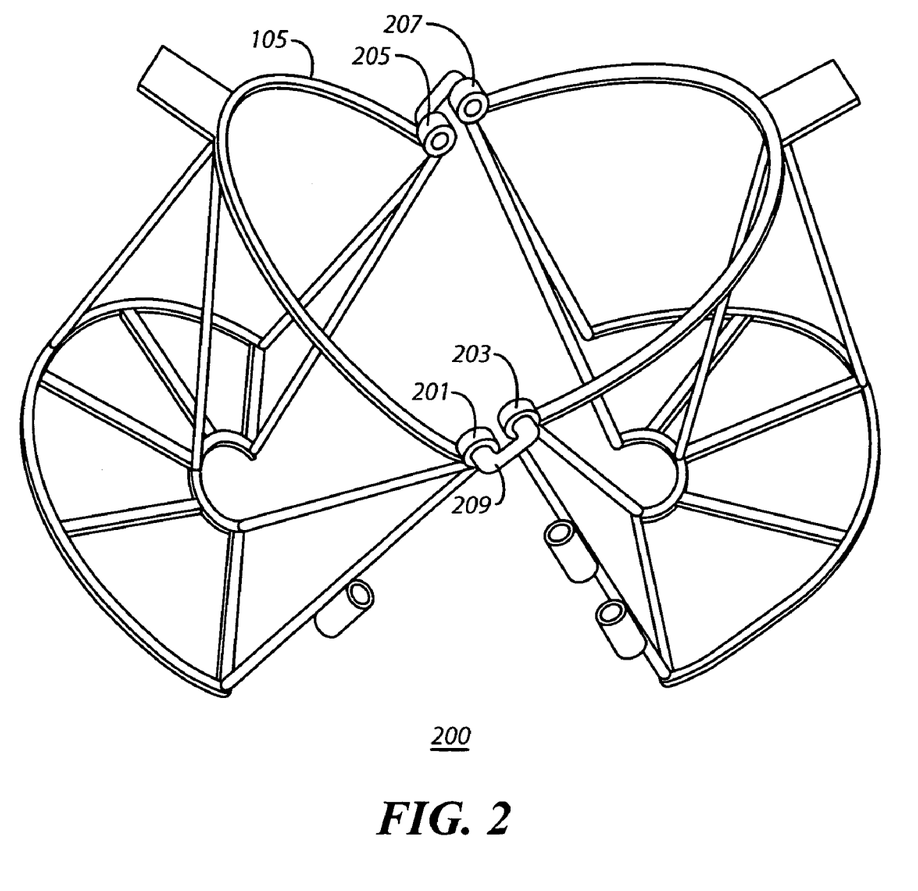
FIG. 2 is an elevated perspective view of the tree root ball wrapping apparatus split at the top pivot points into half sections for tree removal.
Figure 3:
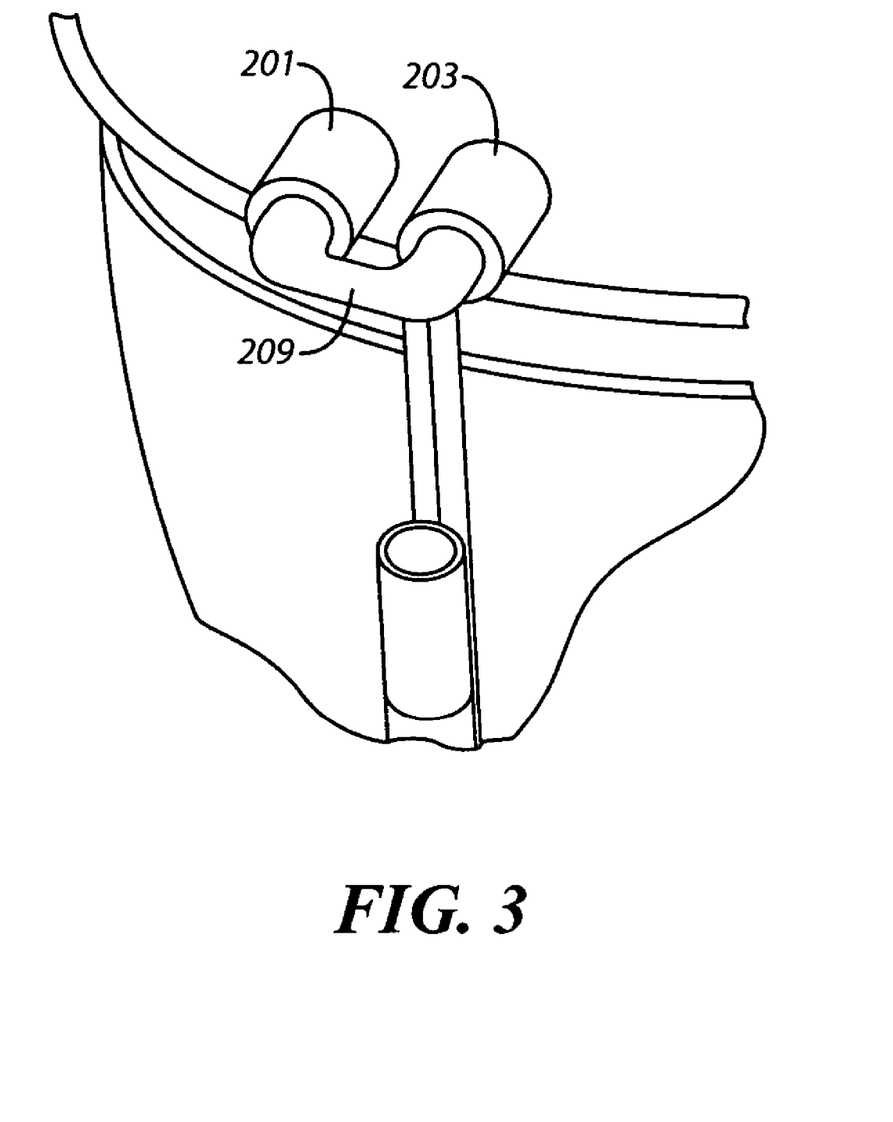
FIG. 3 is close-up perspective view of a U-pin used to secure the top joints of the tree root ball wrapping apparatus.
Figure 4:
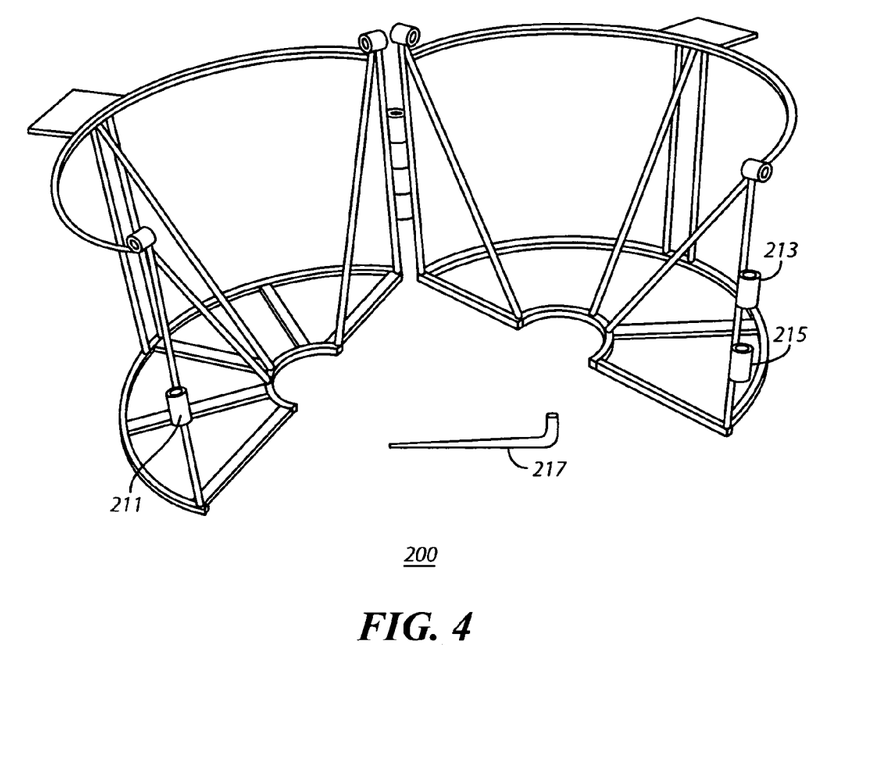
FIG. 4 is an elevated perspective view of the tree root ball wrapping apparatus split at the side pivot points.

FIGS. 2-4 illustrate a feature of the invention which enables the root ball wrapping apparatus to be pivoted to enhance the utility of the device. As best seen in FIG. 2, the tree root ball wrapping apparatus 200 is formed into two halves which can be pivoted from upper joints formed with the upper frame 105. The upper joints are formed using a plurality of top fastening sleeves 201, 203 and 205, 207 that are joined proximate to one another using one or more U-pins 209. FIG. 3 is a close-up view of the U-pin 209 engaged within the top fastening sleeves 201, 203.

Similarly, FIG. 4 illustrates the tree root ball wrapping apparatus 200 opened using its side pivot joints located midsection of the lower frame 113. The side pivot joints are comprised of a plurality of side cylindrical sleeves 211, 213, and 215 that are held into axial alignment using an attachment pin 217. FIG. 4 shows the tree root ball wrapping apparatus 200 opened on one side with the plurality of side cylindrical sleeves on the opposite side held into position using its associated attachment pin 217. Thus, each half of the tree root ball wrapping apparatus 200 may be split into its component halves or pivoted from either the upper frame 105 or the lower frame 113.

As will be evident to those skilled in the art, after insertion into or over a transplantation hole using a loader or other machinery, the attachment pint 217 can be removed where the weight of the root ball will work to spread the device open as its weight sinks into the transplantation hole. This unique pivoting design allows the device to pivot at the U-pins 209 enabling the root ball to lower itself into the transplantation hole. This works to provide a quick and easy method of transplanting a tree with large root ball using a minimal work force. Since the tree root ball wrapping apparatus 200 can be physically separated into two halves either from the upper frame 105 or the lower frame 113, this allows it to have greater versatility while being used in the transplantation process. Moreover, the device can easily be re-used to wrap another tree after removal from a transplantation hole. This invention offers a novel and distinct advantage over other prior art devices since the prior art devices cannot be transported with the tree nor are they inserted into or used above the transplantation hole. This avoids the need to physically move the tree root ball from a position on the ground to a transplantation hole since the invention accompanies the tree into or over the hole.

Figure 5:
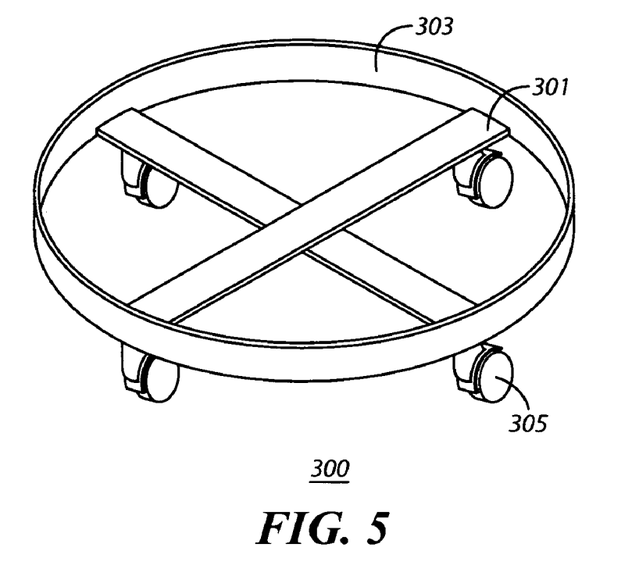
FIG. 5 is an elevated perspective view of the transportation drum dolly used with the tree root ball wrapping apparatus.

FIG. 5 illustrates a drum dolly 300 as used with a tree root wrapping apparatus 100. The drum dolly 300 includes a plurality of support braces 301 and circular base frame 303 for supporting the weight of the tree root ball wrapping apparatus. A plurality of wheels 305 enable a worker to roll the tree root wrapping apparatus along the ground or other surface. In operation, the base section 109 of the tree root wrapping apparatus fits within the circular base frame 305 resting upon the support braces 301. As will be evident to those skilled in the art, the drum dolly 300 provides a great benefit in that the heavy tree as well as the present invention need not be physically carried from location to location. The drum dolly 300 enables a worker to easily move the tree and root ball while using the tree root ball wrapping apparatus to any desired location without the use of machinery. Moreover, a pull handle can be used between the gap (not shown) created between the halves of lower frame 113. This enables the user to easily pull a loaded drum dolly 300 by hand without the use of machinery.

Figure 6:
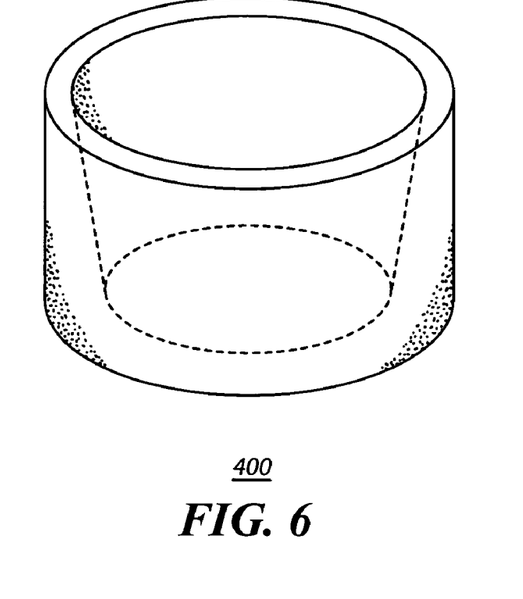
FIG. 6 is an elevated perspective view of a foam insert material used in connection with the tree root ball wrapping apparatus.

FIG. 6 illustrates yet another embodiment of the invention where the tree root ball wrapping apparatus can also be used with a foam insert 400 that acts to trap moisture around the root ball. The foam insert 400 is pliable and non-absorbent such that it can be formed into the shape of a basket and inserted within the lower frame 103. It is impervious to water, resistant to ultraviolet light and fertilizer chemicals and can be manufactured in different colors. As will be evident to those skilled in the art, the foam insert 400 eliminates the need for mulching by providing insulation to the tree root ball during cold weather storage. This works to prevent rapid freezing and thawing cycles. It may be separated into segments (not shown) where it can be held into position by angular support members 107. The foam insert 400 works to contain moisture and nutrients around the root ball thereby sustaining the tree before transplantation such as while it is either being transported or displayed. The use of the foam insert 400 promotes the overall heath of the tree enabling it to sustain itself for longer periods while preventing the soil and roots around the root ball from drying out and separating from the tree. It has a distinct advantage over the use of burlap since limited microbial activity is present to break down the material.

Figure 7:
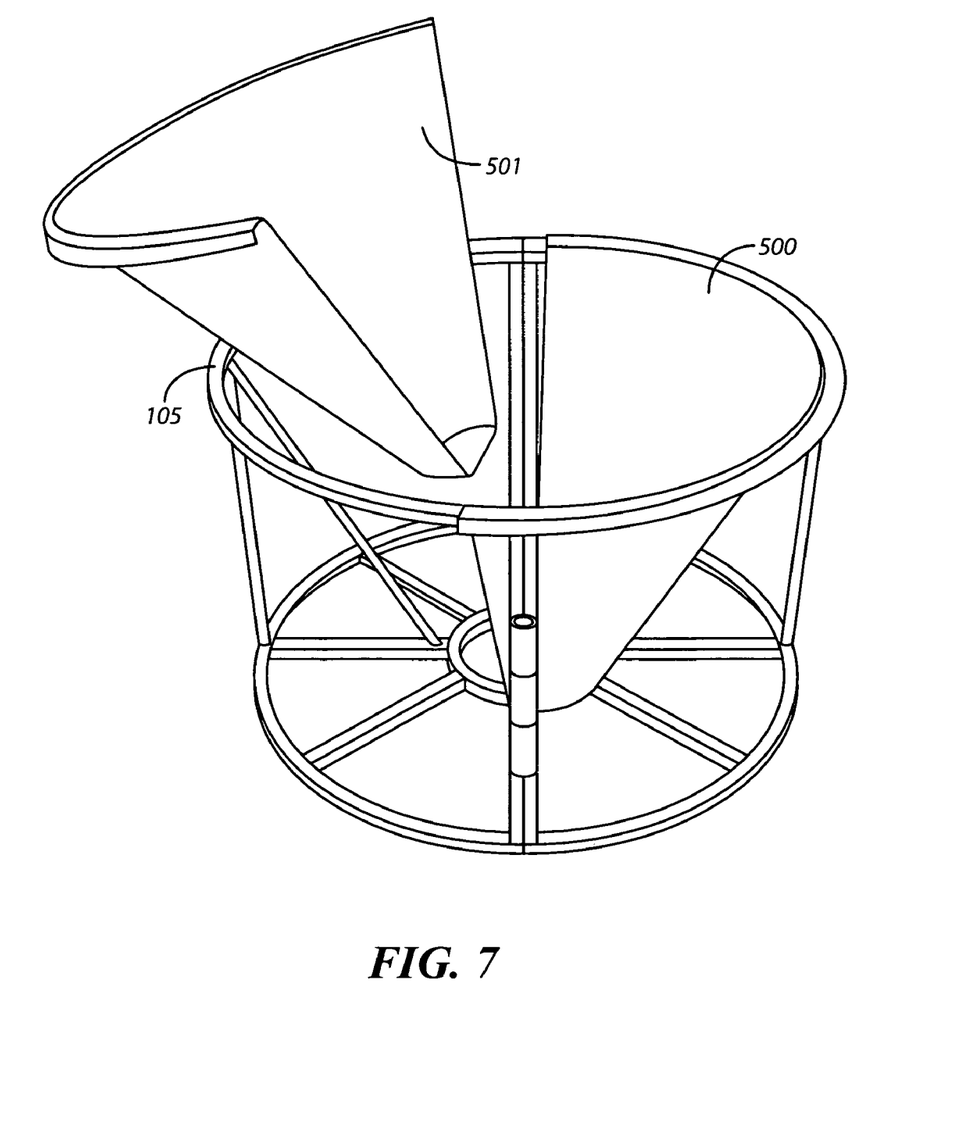
FIG. 7 is an elevated perspective view of a solid insert used for containing soil for transportation.

FIG. 7 illustrates a solid conical side wall insert 500 for use inside of the tree root ball wrapping apparatus that allows the device to be used as a container for transporting soil or other materials. After a tree root ball has been transplanted, the conical insert 500 can be inserted within the outer frame 105 and attached thereto using a folded upper rim 501. The conical insert 500 may be made of hard plastic material and is typically configured in half sections. The conical insert 500 allows the tree root ball wrapping apparatus to act as a closed bucket-like receptacle to transport soil or other planting materials. This allows dirt excavated from a transplantation hole to be transported back to an original location such that it can be used to refill a hole that was initially made when a tree was first removed. In some cases where the soil conditions are suitable, the tree root ball can be deposited directly into the conical insert 500 without containing the root ball with wire or burlap. The tree can then be transported and planted immediately or stored just as if it were placed in a plastic planting pot.

Figure 8:
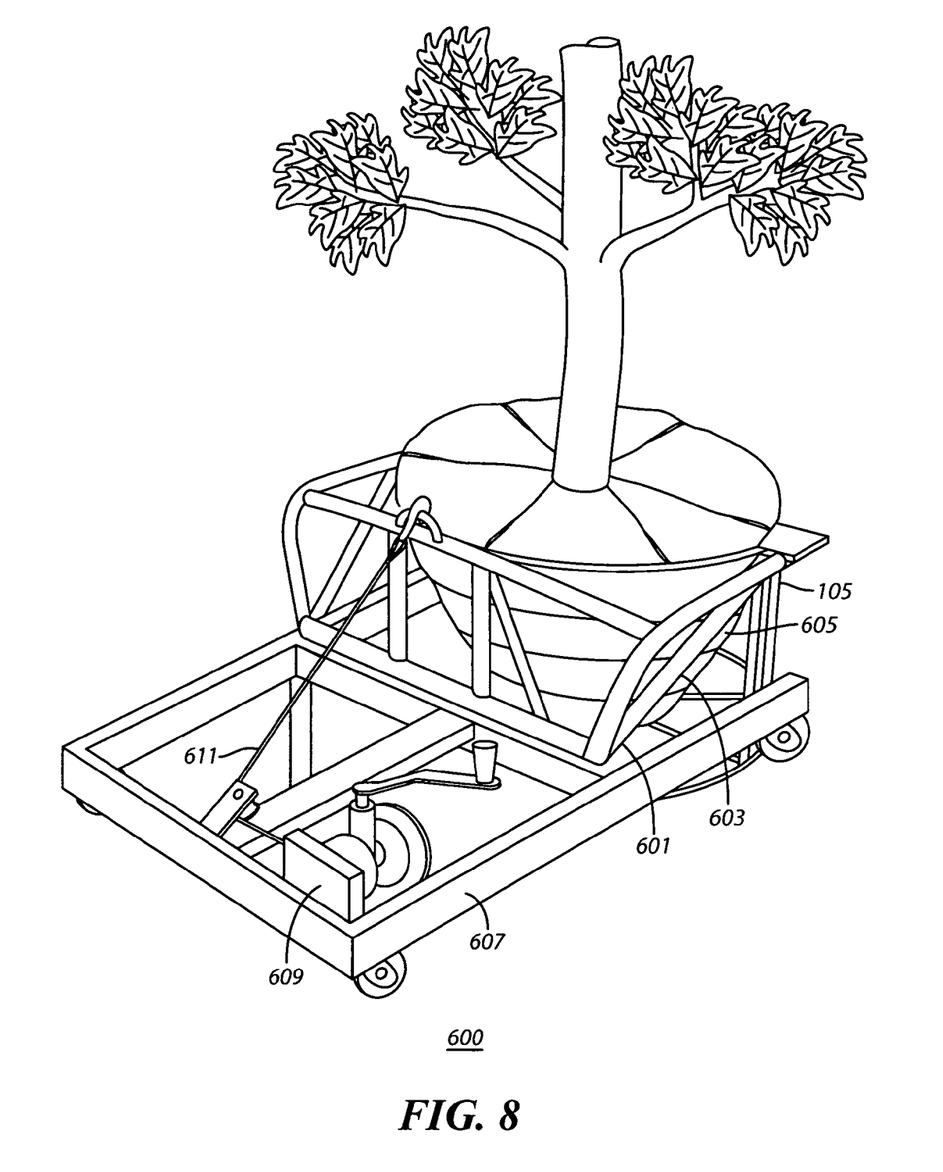
FIG. 8 is an elevated perspective view of a transport stand as used with the present invention.

FIG. 8 illustrates a transport stand 600 comprised of a plurality of rails 601, 603, 605 that form a cradle. The cradle is joined to a rectangular stand 607 that holds the cradle such that it may engage the upper frame 105 of the tree root ball wrapping apparatus 100. In operation, the cradle is open at one end so the transport stand 600 may be moved such that the upper frame 105 is within the cradle. The cradle frictionally engages the carrying stubs 115 and operates so that when the root ball wrapping apparatus 100 is tipped onto its side so that weight of the tree and root ball holds the tree at an angle within the cradle. In view of the heavy weight of a large tree, the cradle may be tipped using a winch 609 and cable assembly 611 where the cradle pivots on the rectangular stand 607. Since the tree is held at some predetermined angle, this allows a tall tree to be easily transported by allowing its branches to be pointed downwind preventing damage to the tree when transported in an open trailer.

Thus, the invention provides a worker the ability to wrap, tie, transport, store, and plant a tree root ball. The invention is relatively inexpensive and reusable, providing a horticultural contractor an opportunity to provide minimal work personnel to accomplish these tasks that generally require a large work crew.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tree root ball wrapping apparatus comprising:
   a first support assembly including a first rigid circular support section positioned in a same horizontal plane within a second rigid circular support section directly connected using a first plurality of rigid support rods in the same horizontal plane with both the first rigid circular support section and second rigid circular support section and extending radially therebetween;
   a second support assembly positioned substantially above the first support assembly and directly connected to the first rigid circular support section using a second plurality of rigid support rods, forming a substantially conical shape, the second support assembly being rigid and circular;
   a third plurality of rigid support rods directly connecting the second support assembly and the second rigid circular support section;
   at least one first hinge directly connected to the second support assembly for splitting both the first support assembly and second support assembly into open half sections to allow objects to be released within the first support assembly; each at least one first hinge comprising a pair of fastening sleeves and a u-pin, a pair of the third rigid support rods positioned directly adjacent one another and beneath the u-pin of a hinged pair of fastening sleeves when in a closed positioned; and
   wherein the tree root ball apparatus forms the substantially conical shape such that a tree root ball rests upon the first support assembly and the second support assembly and is used to hold the tree root ball into a fixed position.

2. A tree root ball wrapping apparatus as in claim 1, further comprising:
   at least one second hinge joining the second plurality of support rods for allowing separation of both the first support assembly and second support assembly into half sections from their side.

3. A tree root ball wrapping apparatus as in claim 2, wherein a tree root ball can be removed from a side of the apparatus.

4. A tree root ball wrapping apparatus as in claim 1, further comprising: at least one carrying stub fixedly attached to the second support assembly for providing a surface for lifting the tree root ball wrapping apparatus.

5. An open frame tree root ball landscaping device used for wrapping tree root balls forming a substantially conical shape comprising:
   a substantially circular base section formed using a first rigid circular member positioned in a same horizontal plane within a second rigid circular member connected using a plurality of radial rigid support spokes rods oriented in a same horizontal plane with both the first rigid circular member and second rigid circular support member;
   a substantially rigid circular guide section positioned above the circular base section;
   a first set of rigid support braces angularly connecting the circular guide section directly around a perimeter of the first circular member, forming a substantially conical shape;
   a second set of rigid support braces directly connecting the circular guide section with the second circular member;
   at least one hinge formed in the substantially circular guide section for allowing the substantially circular base section to be split into open half sections, each at least one hinge comprising a pair of fastening sleeves and a u-pin; a pair of the second set of support braces positions directly adjacent one another and beneath the u-pin of a hinged pair of fastening sleeves when in a closed position; and
   wherein a tree root ball may be positioned upon the substantially circular base section and held into a fixed position using the substantially circular guide section.

6. A landscaping device used for wrapping tree root balls as in claim 5, further comprising:
   at least one hinge formed in the second set of support braces for allowing a tree root ball to be removed from a side of the landscaping device.

7. A landscaping device used for wrapping tree root balls as in claim 6, further comprising:
   at least one locking pin for preventing the at least one hinge from being separated.

8. A landscaping device used for wrapping tree root balls as in claim 5, further comprising:
   at least one carrying stub attached to the circular guide section for providing a surface for lifting the landscaping device.

9. A tree root ball wrapping apparatus used in landscaping comprising:
   a circular lower member comprising an inner rigid circular support section within an outer rigid circular support section positioned in a same horizontal plane and directly connected through a plurality of rigid radial support braces oriented in a same horizontal plane with both the inner rigid circular section and outer rigid circular support section;

a circular upper member positioned above the circular lower member;

a plurality of rigid vertical support braces directly connecting the outer circular support section and the circular upper member;

a plurality of rigid angular support braces directly connecting the inner circular member and the circular upper member forming a substantially conical shape;

at least one hinge integrated with the circular upper member for allowing the circular lower member and circular upper member to be split into open half sections allowing access to the circular lower member when opened;

each at least one hinge comprising a pair of fastening sleeves and a u-pin; a pair of the plurality of rigid vertical support braces positioned directly adjacent one another and beneath the u-pin of a hinged pair of fastening sleeves when in a closed positioned; and wherein the circular upper member and the second plurality of angular support braces are connected about the inner circular member to form a substantially conical shape for holding a tree root ball.

10. A tree root ball wrapping apparatus as in claim 9, further comprising at least one lift support member attached to the circular upper member for providing a surface for the tree root ball wrapping apparatus to be lifted.

* * * * *